United States Patent
Joos et al.

(10) Patent No.: US 8,914,740 B1
(45) Date of Patent: *Dec. 16, 2014

(54) ALIGNING SEGMENTS OF BAR GRAPHS FOR COMPARATIVE ANALYSIS

(75) Inventors: Derek Joos, Rexburg, ID (US); Mark Schultz, Pleasant Grove, UT (US); Matt McMurry, Pleasant Grove, UT (US); Chris Willis, Heber City, UT (US)

(73) Assignee: Domo, Inc., American Fork, UT (US)

( * ) Notice: Subject to any disclaimer, the term of this patent is extended or adjusted under 35 U.S.C. 154(b) by 380 days.

This patent is subject to a terminal disclaimer.

(21) Appl. No.: 13/527,357

(22) Filed: Jun. 19, 2012

Related U.S. Application Data

(60) Provisional application No. 61/506,944, filed on Jul. 12, 2011.

(51) Int. Cl.
*G06F 3/048* (2013.01)
*G06Q 30/02* (2012.01)
*G06Q 10/06* (2012.01)

(52) U.S. Cl.
CPC .............. *G06F 3/048* (2013.01); *G06Q 30/02* (2013.01); *G06Q 10/063* (2013.01); *G06Q 10/06* (2013.01)
USPC ......... 715/764; 715/215; 345/440; 345/440.2

(58) Field of Classification Search
CPC ...... G06F 3/048; G06Q 10/06; G06Q 10/063; G06Q 30/02
USPC .......... 715/764, 215; 345/440, 440.2
See application file for complete search history.

(56) References Cited

U.S. PATENT DOCUMENTS

| | | | | |
|---|---|---|---|---|
| 5,634,133 | A * | 5/1997 | Kelley | 715/209 |
| 6,023,280 | A * | 2/2000 | Becker et al. | 345/440 |
| 6,188,403 | B1 * | 2/2001 | Sacerdoti et al. | 715/764 |
| 6,356,285 | B1 * | 3/2002 | Burkwald et al. | 715/853 |
| 8,108,250 | B1 * | 1/2012 | Moore et al. | 705/7.42 |
| 8,375,068 | B1 * | 2/2013 | Platt et al. | 707/805 |
| 2004/0032427 | A1 * | 2/2004 | Kekki et al. | 345/764 |
| 2005/0068320 | A1 * | 3/2005 | Jaeger | 345/440 |
| 2008/0079747 | A1 * | 4/2008 | Saida et al. | 345/589 |
| 2009/0002373 | A1 * | 1/2009 | MacGregor | 345/440.2 |
| 2009/0096812 | A1 * | 4/2009 | Boixel et al. | 345/646 |
| 2009/0177988 | A1 * | 7/2009 | Martins | 715/764 |
| 2010/0251151 | A1 * | 9/2010 | Alsbury et al. | 715/765 |

* cited by examiner

*Primary Examiner* — Ting Lee
(74) *Attorney, Agent, or Firm* — Raubvogel Law Office

(57) ABSTRACT

A user interface is provided for allowing a user to interact with a graphical display, so as to facilitate comparative viewing of components of the display. A bar graph or other quantitative display is provided, wherein each bar is divided into a plurality of segments. Responsive to user input, segments of a given kind, in different bars, are realigned with one another along a common baseline, so that their sizes can be more easily compared with one another. In at least one embodiment, the realignment is transitory, and the original graph is restored upon further user input and/or after some predetermined time period.

36 Claims, 6 Drawing Sheets

ALIGNING SEGMENTS OF BAR GRAPHS FOR COMPARATIVE ANALYSIS

CROSS-REFERENCE TO RELATED APPLICATIONS

The present application claims priority from U.S. Provisional Application Ser. No. 61/506,944 for "Difference Comparisons in Data Visualizations," filed Jul. 12, 2011, which is incorporated herein by reference.

The present application is related to U.S. Utility application Ser. No. 13/444,619 for "Comparative Graphical Data Representation," filed Apr. 11, 2012, which is incorporated herein by reference.

FIELD OF THE INVENTION

The present invention relates to graphical displays of quantitative data.

DESCRIPTION OF THE RELATED ART

Electronic devices—such as desktop, laptop, and tablet computers—are often capable of storing and displaying quantitative data in various formats.

While quantitative data can be displayed as a list or table of numbers, it is often helpful to display such data as a graph or chart. Such graphs and charts use visual elements to provide context for displayed data, to better express the relative values of different entries, and to enable visual comparisons of values.

One example of a well-known graph is a bar graph. Bar graphs display each data entry as a fixed-width rectangle, or bar, having a height representing that entry's numerical value.

Some bar graphs depict composite data entries, each of which is the sum of two or more smaller entries. In such a bar graph, commonly referred to as a "stacked bar graph", each bar visually depicts an entry's total value, and also includes segments that depict values of components that make up that total value.

Stacked bar graphs display each composite data entry as a subdivided rectangle having a plurality of segments, with the total height representing the entry's total value, and the height of each segment representing the value of one of its component parts.

Referring now to FIG. 4, there is shown an example of a stacked bar graph 400 according to the prior art. Each bar 401 depicts popularity of a sport among all age ranges, based on the number of respondents that indicated their favorite was a particular sport. Each bar 401 is composed of smaller segments that show the breakdown of age ranges of respondents within the total value represented by that bar 401.

Stacked bar graphs visually depict how much each segment contributes to a given total, and allows comparisons among total data entries. However, if can be difficult, in a stacked bar graph, to compare sizes of segments from different data entries with one another, since such segments generally are not aligned vertically with one another. For example, in the graph 400 of FIG. 4, it can be difficult to compare the sizes of the various segments associated with the "over 35" age group, because those segments are not aligned with one another.

SUMMARY

According to various embodiments of the present invention, a user interface is provided—for a computer or other device that displays quantitative data in graphical form—which temporarily realigns parallel graphical elements for clearer comparison. The user interface can be configured to display quantitative data using any well-known graphical form wherein data entries are displayed both by total value and values of their component parts. The user interface further allows the user to interact with the graphical display, for example to designate a selected segment and invoke a transitory realigned graph. The realigned graph is restructured so that similar segments from other data entries are aligned with the selected segment for direct comparison.

In at least one embodiment, a user input invoking a realigned graph—received by a device such as a mouse, keyboard, touchscreen, or the like—simultaneously invokes the realigned graph and also indicates a selected segment (chosen, for example, from among segments of data entries in the entire set). In at least one embodiment, in response to such input, the system of the present invention replaces the graph or chart currently displayed with a realigned graph; in another embodiment, the realigned graph is presented in addition to the initial graph. In the realigned graph, the visual representation of each data entry is adjusted so that instances of one kind of segment can be more easily compared with one another. For example, for a stacked bar graph, segments sharing a kind with the selected segment are vertically realigned with the selected segment to form a new bar graph with a common baseline. This allows the realigned segments to be more easily compared with one another.

For purposes of the description herein, the term "graph" refers to any suitable graphical representation or representations of quantitative data with the stacked bar graph serving, without limitation, as one example.

In at least one embodiment, the user can provide input, such as a command to dismiss the realigned graph. This causes the currently displayed graph to be replaced by the original graph. Alternatively, dismissing the realigned graph can replace the realigned graph with nothing.

In at least one embodiment, the user can provide another input to indicate a new selected segment without dismissing the realigned graph. This adjusts the currently displayed realigned graph so that segments of the selected kind are vertically realigned with one another or easier comparison.

In at least one embodiment, data entries in the graph are ordered from first to last, and indexed by associating a unique label with each entry. This ordering and these labels allow the user to identify each data entry's representation in the graph. In at least one embodiment, the order in which the data entries are presented does not change when transitioning from the original graph to the realigned graph. In another embodiment, a transition to a realigned graph causes data entries to be automatically reordered according to any suitable sequence (e.g. sorted by ascending or descending value).

In at least one embodiment, one possible graph form is a stacked bar graph. In a stacked bar graph, each data entry corresponds to a rectangle rising vertically from a horizontal axis. The height of each of these rectangles represents the total value of the corresponding data entry. The largest total value in the entire set is represented by the tallest rectangle, and each other rectangle's height is a fraction of that height corresponding to the ratio between that (total) data entry and the largest total value.

Additionally, each rectangle is subdivided into multiple shorter rectangles ("segments") rising contiguously from a horizontal axis and positioned end-to end to form a single, taller rectangle. Each segment contributes one part of each data entry's total value. The height of each segment represents the value of its contribution in the same way that the height of each complete rectangle represents the value of each total data entry. Each segment may also be associated with other segments in other data entries; segments so associated with one another are said to be of the same "kind".

One skilled in the art will recognize that the stacked bar graph can be oriented in any direction (horizontally, for example), so that references herein to any particular orientation are merely exemplary.

In response to the user invoking a realigned graph, a new graph is displayed (either in addition to or instead of the original graph) adjusted around an indicated selected segment. In the new graph segments of the selected segment's kind are realigned vertically so that they all share the selected segment's baseline and rise from a common latitude.

In various embodiments, the realigned graph can be made dynamically available to the user whenever it could sensibly apply to the quantitative data currently being graphically displayed. According to various embodiments, the user can invoke, dismiss, or change the selected segment (and thus change which kind of segment is realigned) at will, with the display screen being updated appropriately.

In at least one embodiment, the graduated vertical axis in the realigned graph is rescaled to display only the range of values within the realigned kind of segments.

In at least one embodiment, the realigned graph excludes one or more entries so that it displays only a subset of the data. As an example, this subset could include only the entries following (or preceding) the selected segment's data entry, or a set of entries surrounding the selected segment's data entry. One skilled in the art will recognize that any suitable subset can be used.

Further details and variations are described herein.

BRIEF DESCRIPTION OF THE DRAWINGS

The accompanying drawings illustrate several embodiments of the invention. Together with the description, they serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

According to various embodiments, the present invention can be implemented on any electronic device equipped to receive, store, and present quantitative data. Such an electronic device may be, for example, a desktop computer, laptop computer, smartphone, tablet computer, or the like.

Although the invention is described herein in connection with an implementation in a computer, one skilled in the art will recognize that the techniques of the present invention can be implemented in other contexts, and indeed in any suitable device capable of presenting quantitative data graphically. Accordingly, the following description is intended to illustrate various embodiments of the invention by way of example, rather than to limit the scope of the claimed invention.

Figure 1A:
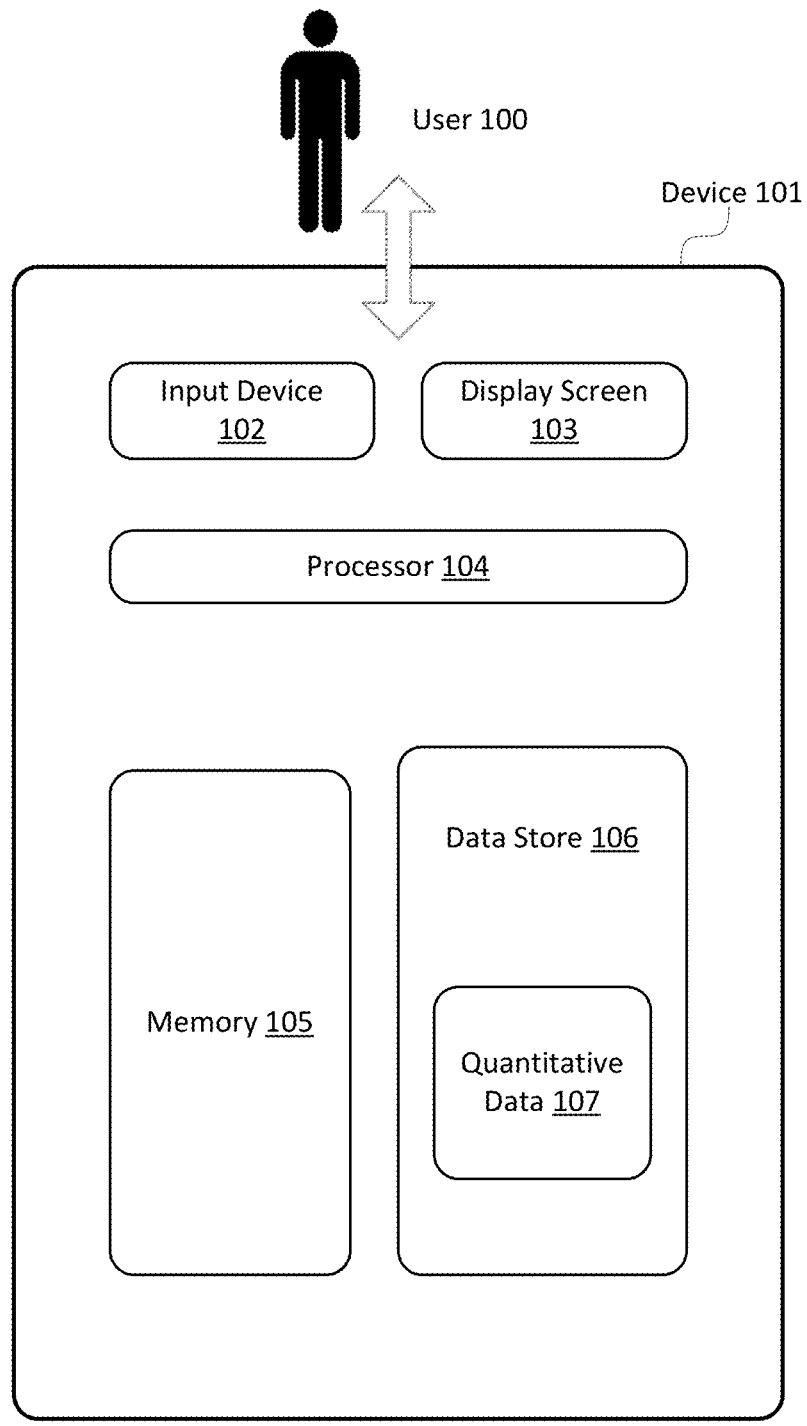
FIG. 1A is a block diagram depicting a hardware architecture for practicing the present invention according to one embodiment of the present invention.

Referring now to FIG. 1A, there is shown a block diagram depicting a hardware architecture for practicing the present invention, according to one embodiment. Such an architecture can be used, for example, for implementing the techniques of the present invention in a computer or other device 101. Device 101 may be any electronic device equipped to receive, store, and present quantitative data.

In at least one embodiment, device 101 has a number of hardware components well known to those skilled in the art. Input device 102 can be any element that receives input from user 100, including, for example, a keyboard, mouse, stylus, touchscreen, touchpad, trackball, accelerometer, five-way switch, microphone, or the like. Input can be provided via any suitable mode, including for example, one or more of: pointing, tapping, typing, dragging, and/or speech. Display screen 103 can be any element that graphically displays quantitative data.

Processor 104 can be a conventional microprocessor for performing operations on data under the direction of software, according to well-known techniques. Memory 105 can be random-access memory, having a structure and architecture as are known in the art, for use by processor 104 in the course of running software.

Data store 106 can be any magnetic, optical, or electronic storage device for data in digital form; examples include flash memory, magnetic hard drive, CD-ROM, or the like. In at least one embodiment, data store 106 stores information describing quantitative data 107.

Data store 106 can be local or remote with respect to the other components of device 101: in at least one embodiment, data entered into device 101 through input device 102 is transmitted to a remote data and stored there. This transmission can be done wirelessly, by Ethernet connection, or by any other appropriate means. This communication with other electronic devices is provided as an example and is not necessary to practice the invention.

In at least one embodiment, data store 106 is detachable in the form of a CD-ROM, DVD, flash drive, USB hard drive, or the like. Quantitative data 107 can be entered into such a detachable data store 106 from a source outside of device 101 and later displayed after data store 106 is connected to device 101. In another embodiment, data store 106 is fixed within device 101 and receives data only through input device 102.

Figure 1B:
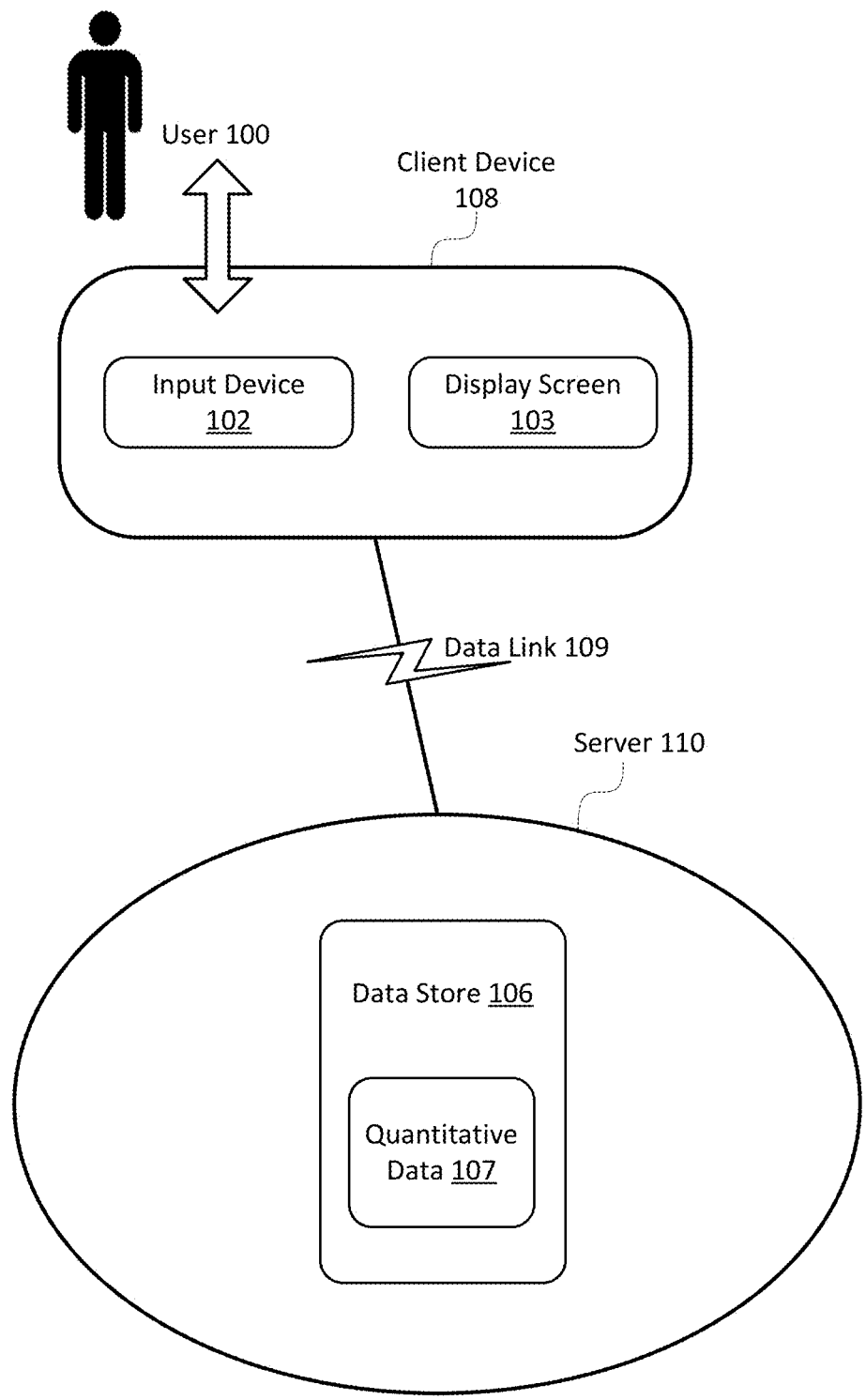
FIG. 1B is a block diagram depicting a hardware architecture for practicing the present invention in a client/server environment, according to one embodiment of the present invention.

Referring now to FIG. 1B, there is shown a block diagram depicting a hardware architecture for practicing the present invention in a client/server environment, according to one embodiment of the present invention. Such an implementation may use a "black box" approach, whereby data storage and processing are done completely independently from user input/output. An example of such a client/server environment is a web-based implementation, wherein client device 108 runs a browser that provides a user interface for interacting with web pages and other web-based resources from server 110.

Client device 108 can be any electronic device incorporating input device 102 and display screen 103, such as a desktop computer, laptop computer, personal digital assistant (PDA), cellular telephone, smartphone, music player, handheld computer, tablet computer, kiosk, game system, or the like. Data link 109 can be any mechanism for transmitting data between electronic devices, such as a wired or wireless network, or other suitable means. Client device 108 transmits data representing user commands to server 110 via data link 109. Server 110 transmits data representing graphical displays to client device 108 via data link 109.

In this implementation, server 110 is responsible for all data storage and processing, and incorporates data store 106, which stores quantitative data 107. Server 110 may include additional components as needed for retrieving data from data store 106 in response to request from client device 108.

In at least one embodiment, quantitative data 107 is organized into one or more well-ordered data sets, with one or more data entries in each set. Data store 106, however, can have any suitable structure. Accordingly, the particular organization of quantitative data 107 within data store 106 need not resemble the form it is displayed in to user 100. In at least one embodiment, an identifying label is also stored along with each data entry, to be displayed along with each data entry.

As described above, quantitative data can be received from a source outside of device 101, or may be pre-loaded on data store 106. In at least one embodiment, input device 102 is configured to receive data entries from user 100, to be added to quantitative data 107 held in data store 106. User 100 may provide such data entries via the hardware and software components described above according to means well-known to those skilled in the art. Data 107 may come from any other suitable source, or combination of sources, including those mentioned above.

In the examples presented herein, quantitative data 107 is shown as rational numbers, recorded and displayed in decimal form using Arabic numerals. However, such representations are not necessary to practice the invention. Indeed, the data can be displayed in any suitable format.

Display screen 103 presents quantitative data 107 to user 100 in numeric and/or graphical form, as described in more detail herein. The data entries presented on display screen 103 may include all of, or some subset of, quantitative data 107. In at least one embodiment where only some of quantitative data 107 is presented at a time, a dynamic control, such as a scrolling mechanism, may be available via input device 102 to change which data entries are currently displayed.

Data entries from quantitative data 107 are presented to user 100, via display screen 103, in the form of a graph. These graphs use visual cues, such as height, distance, and/or area, to convey the value of each data entry. In at least one embodiment, a label accompanies each data entry on display screen 103, or can be displayed when user 100 taps on or clicks on a data entry, or causes an onscreen cursor to hover over a data entry.

By default, quantitative data 107 is presented to user 100 in composite form where each data entry is displayed both according to its total value, and additionally according to the value(s) of each of its component parts. In at least one embodiment, a realigned graph adjusted to facilitate comparisons among the component parts of different data entries, can be presented automatically or in response to user input, as described in more detail herein.

In at least one embodiment, in response to a user input received by input device 102, a realigned graph is shown on display screen 103. The user input also indicates a component part (represented by one of the segments in the graph) currently being displayed, to serve as the selected segment for the realigned graph. This selection determines which kind of segments will be realigned with one another in the realigned graph. In at least one embodiment, such user input includes one or more of: selecting, tapping, clicking, hovering one of the segments on the graph, selecting a command from a menu, clicking on an icon, entering a command on a keyboard, and/or performing any other suitable input operation(s). The realigned graph can be shown instead of or in addition to the original graph.

The realigned graph presents the segments of the selected kind as a bar graph with a common baseline. Segments of the same kind as the selected segment are vertically repositioned as needed to realign them with one another; for example, the segments can be repositioned so that they rise from the x-axis or from another common latitude.

In at least one embodiment, the graduations shown on the vertical axis are changed in the realigned graph so that the height of the new baseline (where the selected segment begins in the original graph) represents zero. In an alternative embodiment, the graduations shown on the vertical axis remain the same in the realigned graph as they were in the original graph. In yet another embodiment, the graduations shown on the vertical axis are not shown in the realigned graph.

In at least one embodiment, in the realigned graph a visual effect is applied to those segments that do not belong to the selected kind. This visual effect can include darkening or blacking out the affected segments, making them translucent, changing their color, some combination of these, or the like. In an alternative embodiment, in the realigned graph a visual effect is applied to the segments within the selected kind. The visual effect might include outlining, bolding, highlighting, some combination of these, or the like. In yet another embodiment, in the realigned graph, only segments of the selected kind appear, and other segments are excluded.

In at least one embodiment, a second user input dismisses the realigned graph, so that display screen 103 again presents quantitative data 107 in the original format. In at least one embodiment, the realigned graph persists for as long as the first user input continues, and is dismissed as soon as the first user input ends. In at least one embodiment, the realigned graph is dismissed automatically after a predetermined delay.

In at least one embodiment, a third user input causes a new segment to be selected, which may or may not be of a different kind than the previously selected segment. Display screen 103 is updated accordingly, to realign segments of the same kind accordingly.

In at least one embodiment, each entry in quantitative data 107 is a composite sum made up of multiple parts; one part each from multiple kinds. The same kinds of parts may (but need not) appear in all data entries in the graph. Thus, if each entry includes one part of each kind, each entry is the sum of N parts, and quantitative data 107 includes N kinds of parts.

In at least one embodiment, quantitative data 107 is presented in a stacked bar graph. In a stacked bar graph, each data entry is represented by a rectangle rising vertically from a horizontal axis. The height of each rectangle represents the value of the corresponding data entry. The largest value in the entire set is represented by the tallest rectangle, and each other rectangle's height is a fraction of that height corresponding to the ratio between that data entry and the largest value.

In at least one embodiment, each rectangle in the stacked bar graph is divided into multiple rectangular segments. Each segment represents a part of the data entry represented by the rectangle it subdivides. All segments representing parts of one data entry are displayed contiguously and end-to-end vertically so that they form the one, large rectangle representing the composite data entry. The height of each segment is a fraction of the height of the tallest (complete) rectangle corresponding to the ratio between that factor and the largest (total) data entry.

Thus, the stacked bar graph depicts not only each data entry's total value (indicated by each complete rectangle's height) and trends in the composite data set, but also values of individual component parts common to each composite entry. However, most segments (other than the bottom-most ones) are not aligned vertically with other segments of the same kind, making it difficult to compare them with one another.

In at least one embodiment, the realigned graph displays the segments of the selected kind in a new vertical location within each complete rectangle. Each realigned segment is displayed so that its bottom edge is positioned in alignment with the bottom edge of the selected segment in the initial graph. Each segment maintains the same height that it had in the initial graph. In an alternative embodiment, each realigned segment is displayed so that its bottom edge is positioned at a height indicated by user input.

In at least one embodiment, segments other than the selected kind are dimmed, blacked-out, greyed, made translucent, or otherwise de-emphasized in the realigned graph. Thus, visual inspection of the realigned graph more easily reveals trends in the selected kind. In another embodiment, segments of the selected kind are highlighted, outlined, bolded, re-colored, or otherwise emphasized in the realigned graph. In yet another embodiment, only segments of the selected kind are displayed in the realigned graph, with segments outside the selected kind omitted.

Figure 2A:
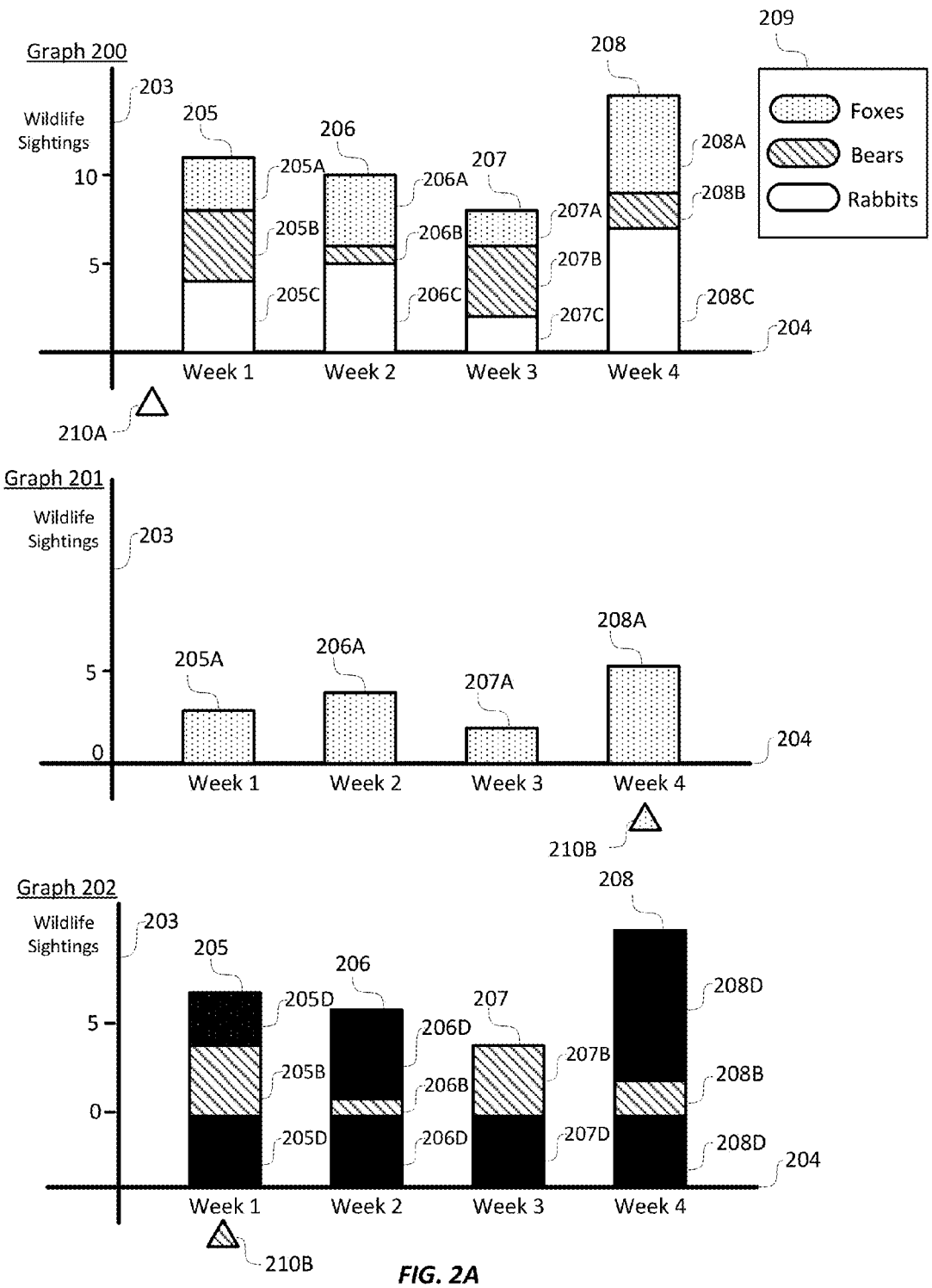
FIG. 2A is an example of a stacked bar graph depicting a data set in an initial form, along with two realigned graphs with two different selected segments (of two different kinds), as displayed according to one embodiment of the present invention.

Referring now to FIG. 2A, there is shown an example of a stacked bar graph as displayed on display screen 103 according to an embodiment of the present invention, first in initial form as original graph 200; and then as two realigned graphs 201 and 202, with two different segments selected to provide the baseline and selected kind. The example data set represents weekly wildlife sightings for a fictional wilderness preserve over four weeks. Original graph 200 displays the composite data set.

The data set is measured in number of animals sighted, and Y-axis 203 is labeled accordingly. X-axis 204 is marked with each composite data entry's label. Four data entries labeled "Week 1," "Week 2," "Week 3," and "Week 4" are represented by corresponding complete rectangles 205-208. The total values of these data entries are shown by the height of their corresponding rectangles 205-208 as measured along y-axis 203.

In this example, each composite data entry, representing total animal sightings for the week, is the sum of three parts: (1) the number of fox sightings for the week; (2) the number of bear sightings for the week; and (3) the number of rabbit sightings for the week. The heights of segments 205A through 208A represent the number of fox sightings for their corresponding data entries. Similarly, the heights of segments 205B through 208B, and 205C through 208C, represent the numbers of bear and rabbit sightings, as indicated by legend 209.

In this examples, small graphical indicators 210A-C are displayed below x-axis 204 to show which segment is the selected segment. One skilled in the art will recognize that any suitable indicators can be used, and that the depicted indicators 201A-C are merely exemplary. In original graph 200, indicator 210A is not directly below any of the four data entries, showing that no segment is selected. Alternatively, indicator 210A can be omitted in original graph 200.

As described above, in response to user input selecting a segment of one of the rectangles 205-208, graph 200 is realigned. Graph 201 depicts an example of such realignment after fox sightings during week 1, represented by segment 208A, is selected. Graph 201 might be presented, for example, in response to user 100 tapping or clicking on rectangle 208A or performing some other input operation indicating that a realigned graph should be shown.

In example realigned graph 201, fox sightings during week 4 (represented by segment 208A) is the selected segment, and thus fox sightings is the selected kind of segment. Segments 205A, 206A, and 207A represent fox sightings during other weeks, are of the selected kind.

In example realigned graph 201, indicator 210B is now positioned below the rectangle for week 4 sightings, and is now shares the dot pattern (or color) common to the segments representing fox sightings. Thus, indicator 210B reminds user 100 that segment 208A is the selected segment.

In example realigned graph 201, the segments of the selected kind, segments 205A-8A, have the same heights they did in original graph 200, but are now flush with x-axis 204 and rise from a common latitude. It is now easier to compare fox sightings from week to week. As described above, after some condition causes the realigned graph to be dismissed, original graph 200 is restored so that total animal, bear, and rabbit sightings are again displayed as well.

In example realigned graph 201, segments other than the selected kind, representing bear and rabbit sightings, are not displayed. As described above, in other embodiments, these other segments may be displayed, but may be deemphasized, grayed out, dimmed, or otherwise visually distinguished from those belonging to the selected kind.

In example realigned graph 201, y-axis 203 has been rescaled so that the height of each segment measured along y-axis 203 corresponds to the value of that segment only. This rescaling is an optional feature and may be omitted.

In at least one embodiment, when a segment is selected that is adjacent to the x-axis in the original graph, such as each of the rabbit segments in original graph 200, no realigned graph is displayed. In an alternative embodiment, a realigned graph is displayed with the segments of the selected kind positioned at the same heights as their corresponding segments in the original graph. In yet another embodiment, a realigned graph is displayed with the segments having the same heights as their corresponding segments in the original graph, rising from a common latitude indicated by user input.

Referring again to FIG. 2A, there is shown another example of a realignment of original graph 200. Graph 202 might be displayed in response to a user command invoking a realigned graph and designating bear sightings during week 1, represented by segment 205B, as the selected segment. Segments 206B-8B represent bear sightings, and so are members of the selected kind.

In this example graph 202, selected segment 205B begins and ends vertically at same points as the corresponding segment in original graph 200. The other segments of the selected kind (bear segments 206B-8B) have the same segment height as the corresponding segments in original graph 200, but are now repositioned vertically to rise from the same latitude as selected segment 205B.

In example realigned graph 202, indicator 210C is now positioned below the rectangle for week 1 sightings, and is now shares the slashed pattern common to the segments representing bear sightings. Thus, indicator 210C reminds the user that segment 205B is the selected segment.

In example realigned graph 202, the segments of the selected kind, segments 205B-8B, have the same heights they did in original graph 200, but have been realigned so their bottom edges are at a common latitude. It is now easier to compare bear sightings from week to week. As described above, after some condition causes the realigned graph to be dismissed, original graph 200 is restored so that total animal, fox, and rabbit sightings are again displayed as well.

In example realigned graph 202, y-axis 203 has been rescaled so that the height of each segment measured along y-axis 203 corresponds to the value of that segment. Additionally, the height along y-axis 203 representing the value zero now corresponds to the bottom edge of selected segment 205B. This rescaling is an optional feature and may be omitted.

In realigned graph 202, the areas 205D-208D within rectangles 205-208 but outside of segments 205B-208B are blacked out. This provides user 100 with a rough approximation of where original graph 200 was before realignment, but is not meant to accurately display the total values of the data entries represented by rectangles 205-8. This darkening is an optional feature and may be omitted.

In realigned graphs, segments of the selected kind may rise from a point close enough to the top of the initial (complete) rectangle so that blacked-out version of the realigned (complete) rectangle is taller than the corresponding rectangle in original graph 200. Thus, in at least one embodiment, the height of complete rectangles in realigned graphs no longer displays the value of their corresponding composite data entries with perfect fidelity. The realigned graph more clearly displays values and trends in the selected kind, at the expense of total values and other kinds.

In at least one embodiment, realigned stacked bar graphs, when invoked, replace original graph 200 on display screen 103. In another embodiment, realigned graphs, when invoked, appear alongside original graph 200 on display screen 103. In at least one embodiment, when user 100 selects a different segment, the currently displayed realigned graph is dismissed and a new one is displayed.

In at least one embodiment, when the realigned graph is invoked, user 100 may select any baseline point to be used for alignment of all segments. In response to such selection, all segments of the selected kind are aligned so that their bottom edges are at a position corresponding to the selected baseline point. In this embodiment, the baseline point need not correspond to the base level of any segment, and may be selected by tapping, clicking, or hovering over any appropriate point corresponding to a point along y-axis 203. Any other suitable mechanism can be used for selecting a baseline point, whether by direct manipulation, text input, and/or any other form of input.

Figure 2B:
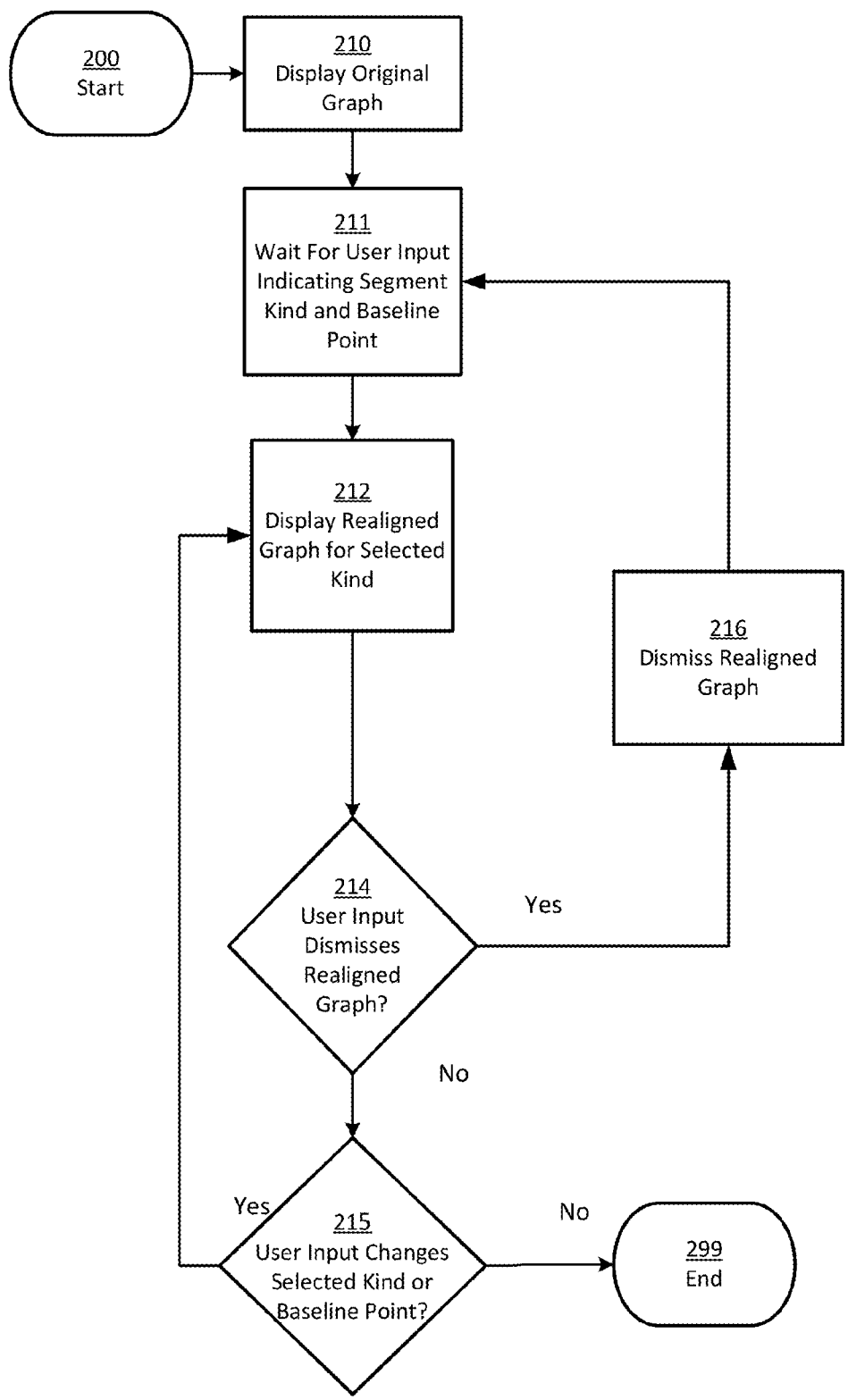
FIG. 2B is a flowchart depicting a process of invoking a graph in realigned form in response to user input, according to one embodiment of the present invention.

Referring now to FIG. 2B, there is shown a flow chart generally depicting a process of displaying realigned graphs responsive to user input, according to one embodiment of the present invention. An initial, original graph is displayed 210 on display screen 103. This graph can be of any appropriate type, with data entries represented by lines or areas measured along different parts of a shared, linear axis. In one embodiment, as described herein, the graph is a bar graph having multiple stacks of segments; according to the techniques of the present invention, segments of a particular kind can be automatically realigned with one another for ease of comparison.

In step 211, display screen 103 continues to display the initial graph until input device 102 receives input from user 100 invoking a realigned graph and selecting both a segment kind and a baseline point. This input may be of any suitable type, including for example: positioning a cursor over a section of a graph corresponding to a value along an axis or corresponding to a data entry and clicking; positioning a cursor and hovering; tapping a touchscreen with a finger or stylus at a point corresponding to a value or data entry; a voice command indicating a value or data entry; or the like.

In step 212, display screen 103 displays a realigned graph wherein graphical representations from the indicated subset are measured along a common linear axis, with all measurements starting from the indicated baseline point. This realigned graph may be shown in addition to, or instead of, the initial graph. The displaying of the realigned graph may be accompanied by a transition effect, such as seeing the elements of the graph grow, move, shrink, and/or change color. In at least one embodiment, the realigned graph only includes those segments of the same kind as the selected segment; in other embodiments, other segments may also be displayed, and may be grayed out, blacked out, or otherwise visually distinguishable from those of the same kind as the selected segment.

In at least one embodiment, display screen 103 continues to display the realigned graph (instead of, or in addition to, the original graph) until some predetermined end condition occurs. Display screen 103 may continue to display the realigned graph until dismissed by user input, or it can display the realigned graph for as long as a cursor, stylus, or finger hovers over a graph element. Alternatively, it can display the graph for a predetermined length of time.

In step 214, input from user 100 dismisses the realigned graph. This input, received by input device 102, may be in the form of positioning a cursor, pointer, stylus, or finger over a cancel box on display screen 103, moving a cursor or pointer away from a graph element so that it no longer hovers over it, or the like. In at least one embodiment, the realigned graph can be dismissed automatically after some predetermined wait period.

In step 215, input from user 100 indicates a new baseline point, segment kind, or both. This may be done by means similar to step 211, where user 100 indicated a segment kind and baseline point.

In step 216, the realigned graph is dismissed and display screen 103 displays the original graph. In at least one embodiment wherein the realigned graph replaced the original graph on display screen 103, the original graph now replaces the realigned graph. In another embodiment wherein the realigned graph is displayed along with the original graph, the realigned graph is replaced with nothing. In at least one embodiment, display of the realigned graph is transitory, so that it can be dismissed in response to user input in step 214, or because the user input from step 211 ceased, or automatically after some predetermined time period.

Figure 3:
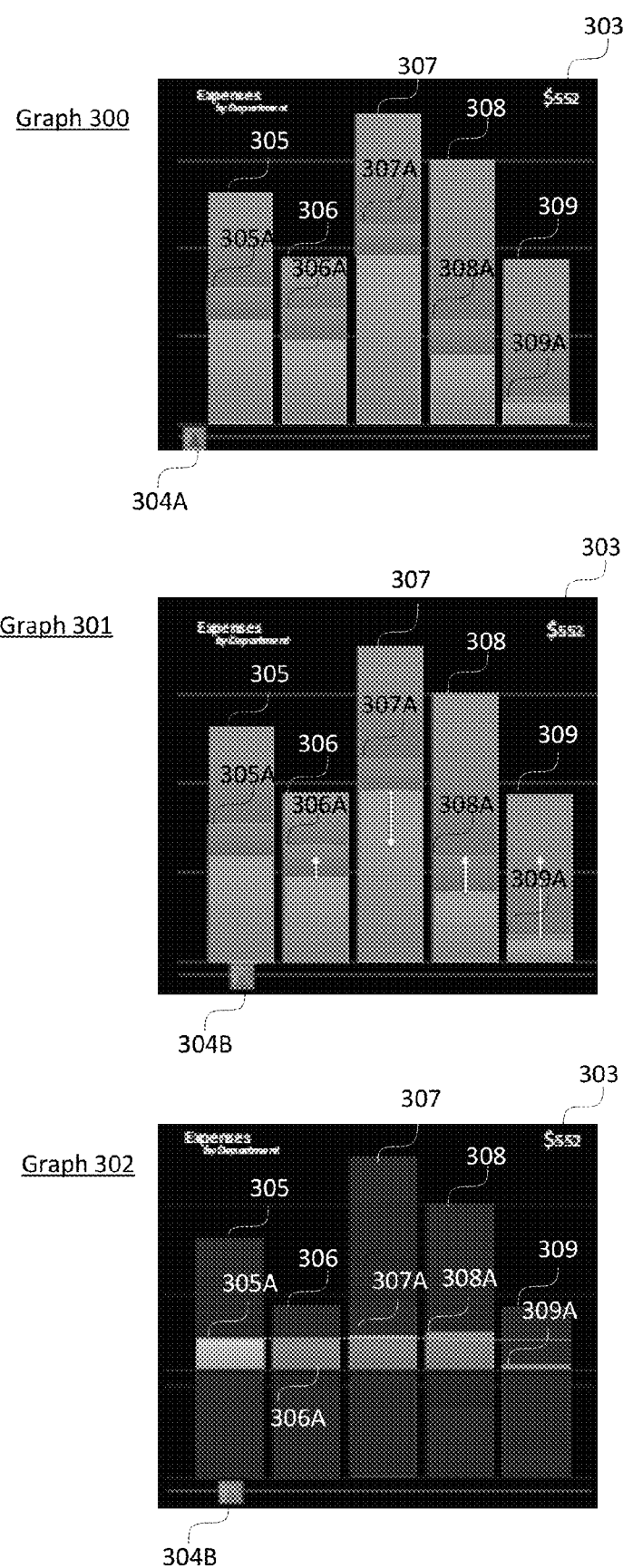
FIG. 3 is a series of screen shots illustrating an example of realignment of a stacked bar graph.
Figure 4:
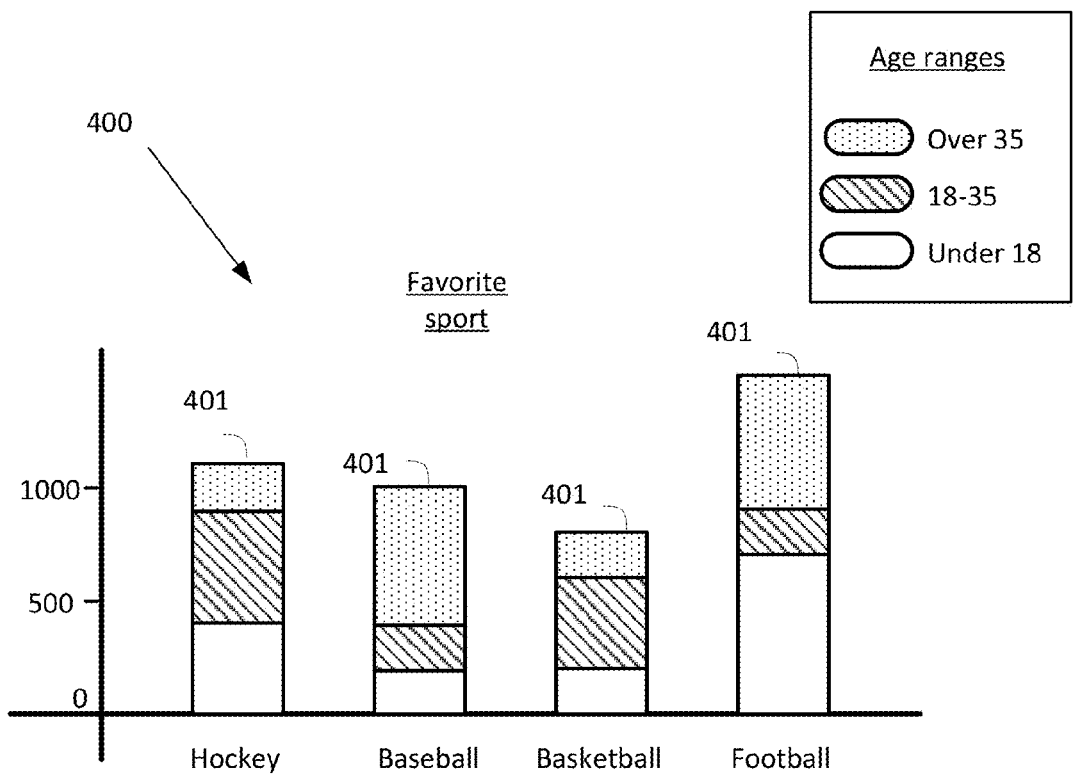
FIG. 4 is an example of a stacked bar graph according to the prior art.

Referring now to FIG. 3, there is shown a series of screen shots illustrating an example of realignment of a stacked bar graph according to at least one embodiment. The series of screen shots depicts the animation that is used to transition from original graph 300 to a realigned graph. Original graph 300 depicts an expense report measured in dollars over five different time periods, represented by stacked bars 305-309, including segments 305A-309A. Indicator 304A is positioned to the left of the first bar, showing that no segment is currently selected.

Graph 301 depicts an intermediate stage that is presented, in at least one embodiment, after user has invoked a realigned graph and has selected segment 305A (an orange segment.) Segments 305A-309A are all orange segments, and thus all members of the selected kind. In response to such input, therefore, 305A-309A are realigned with one another.

In at least one embodiment, the white arrows shown in graph 301 are not present in the actual display, but are depicted in the Figure merely to show a direction and extent of movement of each of segments 306A-309A in response to invoking the realignment operation (segment 305A does not move, since it is already in the selected position). In at least one embodiment, such realignment takes place in a smooth, continuous fashion, so that graph 301 is an example of a screen shot depicting the realignment while it is in progress. For example, 306A-309A can slide smoothly from their positions in graph 300 to their positions in graph 302. In at least one embodiment, the segments are repositioned instantaneously and the movement depicted in graph 301 is only conceptual.

In example graph 301, indicator 304B is now positioned below the first data entry's stacked bar 305; its color is now orange, to indicate that the orange segment 305A of the first data entry 305 is now the selected segment. In example graph 301, numerical indicator 303 shows the total value ($552) of data entry 305 that includes selected segment 305A. Numerical indicator 303 is an optional feature and can be omitted.

Graph 302 is an example of the display after the realignment process is complete. Since orange segment 305A is the selected segment, it occupies the same vertical position as it did in original graph 300. Each other orange segment 306A-309A has the same height as it did in original graph 300, but is now positioned vertically so as to be aligned with the bottom edge of segment 305A.

In example graph 302, selected segment 305A is highlighted and colored a brighter orange than other orange segments. This is an option feature that, in conjunction with indicator 304B, reminds user 100 which segment is the selected segment, and can be omitted.

In example graph 302, segments that are not of the selected kind are displayed in the background in the same position as they were in original graph 300, but are grayed out. In an alternative embodiment, this background is omitted. In yet another embodiment, segments that are not of the selected kind are de-emphasized by other means.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics of the invention.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment of the invention. The appearances of the phrases "in one embodiment" or "in at least one embodiment" in various places in the specification are not necessarily all referring to the same embodiment.

In various embodiments, the present invention can be implemented as a system or a method for performing the above-described techniques, either singly or in any combination. In another embodiment, the present invention can be implemented as a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the invention include: a mobile phone, personal digital assistant, smartphone, kiosk, server computer, enterprise computing device, desktop computer, laptop computer, tablet computer, consumer electronic device, or the like. An electronic device for implementing the present invention may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for presenting a graph displaying a plurality of data entries in graphical form, each data entry having a value, the method comprising:
    displaying a first graph on a display screen, the first graph portraying a plurality of quantitative data entries having a plurality of baseline values;
    at an input device, receiving first user input invoking a realigned graph and specifying a baseline value; and
    responsive to the first user input, displaying, on the display screen, a realigned graph wherein each of at least a subset of the data entries is repositioned to a location corresponding to the specified baseline value,
    wherein each of the first graph and the realigned graph comprises a bar graph,
    wherein the first bar graph comprises at least two composite data entries, each composite data entry comprising a bar having at least two segments, and wherein at least a first segment of a first composite data entry is of a common kind with at least a second segment of a second composite data entry, and wherein the first and second segments are not aligned with one another; and
    wherein displaying the realigned bar graph comprises displaying a realigned graph wherein the first and second segments are aligned with one another.

2. The method of claim 1, wherein the user input specifying a baseline point identifies one of the displayed data entries, and wherein the specified baseline value is established as a value corresponding to a baseline of the identified data entry.

3. The method of claim 2, wherein the first graph comprises a bar graph having at least one composite data entry, wherein each composite data entry comprises at least one segment, and wherein the specified baseline value is established as a value corresponding to a bottom edge of a displayed segment corresponding to the identified data entry.

4. The method of claim 2, wherein at least a subset of the data entries remain stationary while other data entries are repositioned, and wherein displaying the realigned graph comprises displaying the identified data entry and the repositioned data entries in a manner that is visually distinctive manner with respect to the display of the data entries that remain stationary.

5. The method of claim 2, wherein at least a subset of the data entries remain stationary while other data entries are repositioned, and wherein displaying the realigned graph comprises graying out the data entries that remain stationary other than the identified data entry.

6. The method of claim 2, wherein at least a subset of the data entries remain stationary while other data entries are repositioned, and wherein displaying the realigned graph comprises highlighting the identified data entry and the repositioned data entries.

7. The method of claim 2, wherein the subset of graphic representations in the realigned graph are the fellow members of a shared kind of data entries including the selected entry.

8. The method of claim 1, further comprising:
    after a predetermined time delay, dismissing the realigned graph and restoring the display of the first graph.

9. The method of claim 1, further comprising:
    at the input device, receiving second user input dismissing the realigned graph; and
    responsive to the second user input, dismissing the realigned graph.

10. The method of claim 9, further comprising:
    responsive to the second user input, restoring the display of the first graph.

11. The method of claim 1, further comprising:
    at the input device, receiving third user input specifying a new baseline value; and
    responsive to the third user input, adjusting the realigned graph to reposition each of at least a subset of the data entries to the new baseline value.

12. The method of claim 1, wherein displaying the realigned graph comprises:
    applying a transition effect depicting motion of the repositioned data entries from their original locations to their repositioned locations.

13. The method of claim 1, wherein displaying the realigned graph comprises:
    moving at least a subset of the data entries from their original locations to locations corresponding to the specified baseline value.

14. The method of claim 1, wherein each segment in the first bar graph has a height, and wherein each composite data entry's bar has a height corresponding to the sum of heights of the component segments in that composite data entry.

15. The method of claim 14, wherein displaying the first bar graph comprises, for each composite data entry, displaying the component segments adjacent to one another along an axis corresponding to a long axis of the composite data entry's bar.

16. The method of claim 14, wherein each component segment comprises a bottom edge, and wherein displaying the first bar graph comprises, for each composite data entry, displaying the component segments vertically adjacent to one another within the composite data entry;

and wherein displaying the realigned bar graph comprises moving at least one component segment so that the bottom edges of all component segments of a kind are aligned within one another along a horizontal axis.

17. A computer program product for presenting a graph displaying a plurality of data entries in graphical form, each data entry having a value, the computer program product comprising:

a non-transitory computer-readable storage medium; and
computer program code, encoded on the medium, configured to cause at least one processor to perform the steps of:
displaying a first graph on a display screen, the first graph portraying a plurality of quantitative data entries having a plurality of baseline values;
at an input device, receiving first user input invoking a realigned graph and specifying a baseline value; and
responsive to the first user input, displaying, on the display screen, a realigned graph wherein each of at least a subset of the data entries is repositioned to a location corresponding to the specified baseline value,
wherein each of the first graph and the realigned graph comprises a bar graph,
wherein the first bar graph comprises at least two composite data entries, each composite data entry comprising a bar having at least two segments, and wherein at least a first segment of a first composite data entry is of a common kind with at least a second segment of a second composite data entry, and wherein the first and second segments are not aligned with one another; and
wherein displaying the realigned bar graph comprises displaying a realigned graph wherein the first and second segments are aligned with one another.

18. The computer program product of claim 17, wherein the user input specifying a baseline point identifies one of the displayed data entries, and wherein the specified baseline value is established as a value corresponding to a baseline of the identified data entry.

19. The computer program product of claim 18, wherein the first graph comprises a bar graph having at least one composite data entry, wherein each composite data entry comprises at least one segment, and wherein the specified baseline value is established as a value corresponding to a bottom edge of a displayed segment corresponding to the identified data entry.

20. The computer program product of claim 18, wherein the subset of graphic representations in the realigned graph are the fellow members of a shared kind of data entries including the selected entry.

21. The computer program product of claim 17, further comprising computer program code, encoded on the medium, configured to cause at least one processor to perform the steps of:
at the input device, receiving third user input specifying a new baseline value; and
responsive to the third user input, adjusting the realigned graph to reposition each of at least a subset of the data entries to the new baseline value.

22. The computer program product of claim 17, wherein the computer program code configured to cause at least one processor to display the realigned graph comprises:
computer program code configured to cause at least one processor to apply a transition effect depicting motion of the repositioned data entries from their original locations to their repositioned locations.

23. The computer program product of claim 17, wherein the computer program code configured to cause at least one processor to display the realigned graph comprises:
computer program code configured to cause at least one processor to move at least a subset of the data entries from their original locations to locations corresponding to the specified baseline value.

24. The computer program product of claim 17, wherein each segment in the first bar graph has a height, and wherein each composite data entry's bar has a height corresponding to the sum of heights of the component segments in that composite data entry.

25. The computer program product of claim 24, wherein the computer program code configured to cause at least one processor to display the first bar graph comprises computer program code configured to cause at least one processor to display, for each composite data entry, the component segments adjacent to one another along an axis corresponding to a long axis of the composite data entry's bar.

26. The computer program product of claim 24, wherein each component segment comprises a bottom edge, and wherein the computer program code configured to cause at least one processor to display the first bar graph comprises computer program code configured to cause at least one processor to display, for each composite data entry, the component segments vertically adjacent to one another within the composite data entry;

and wherein the computer program code configured to cause at least one processor to display the realigned bar graph comprises computer program code configured to cause at least one processor to move at least one component segment so that the bottom edges of all component segments of a kind are aligned within one another along a horizontal axis.

27. A system for presenting a graph displaying a plurality of data entries in graphical form, each data entry having a value, the system comprising:
a display screen, configured to display a first graph, the first graph portraying a plurality of quantitative data entries having a plurality of baseline values;
an input device, configured to receive first user input invoking a realigned graph and specifying a baseline value; and
a processor, communicatively coupled to the display screen and to the input device, configured to, responsive to the first user input, cause the display screen to display a realigned graph wherein each of at least a subset of the data entries is repositioned to a location corresponding to the specified baseline value,
wherein each of the first graph and the realigned graph comprises a bar graph, wherein the first bar graph comprises at least two composite data entries, each composite data entry comprising a bar having at least two segments, and wherein at least a first segment of a first composite data entry is of a common kind with at least a second segment of a second composite data entry, and wherein the first and second segments are not aligned with one another; and wherein the display screen is configured to display the realigned graph by displaying a realigned graph wherein the first and second segments are aligned with one another.

28. The system of claim 27, wherein the user input specifying a baseline point identifies one of the displayed data entries, and wherein the specified baseline value is established as a value corresponding to a baseline of the identified data entry.

29. The system of claim 28, wherein the first graph comprises a bar graph having at least one composite data entry, wherein each composite data entry comprises at least one segment, and wherein the specified baseline value is established as a value corresponding to a bottom edge of a displayed segment corresponding to the identified data entry.

30. The system of claim 28, wherein the subset of graphic representations in the realigned graph are the fellow members of a shared kind of data entries including the selected entry.

31. The system of claim 27, wherein:
the input device is further configured to receive third user input specifying a new baseline value; and
responsive to the third user input, the processor is configured to cause the display screen to adjust the realigned graph to reposition each of at least a subset of the data entries to the new baseline value.

32. The system of claim 27, wherein the display screen is configured to display the realigned graph by applying a transition effect depicting motion of the repositioned data entries from their original locations to their repositioned locations.

33. The system of claim 27, wherein the display screen is configured to display the realigned graph by moving at least a subset of the data entries from their original locations to locations corresponding to the specified baseline value.

34. The system of claim 27, wherein each segment in the first bar graph has a height, and wherein each composite data entry's bar has a height corresponding to the sum of heights of the component segments in that composite data entry.

35. The system of claim 34, wherein the display screen is configured to display the first graph by displaying, for each composite data entry, the component segments adjacent to one another along an axis corresponding to a long axis of the composite data entry's bar.

36. The system of claim 34, wherein each component segment comprises a bottom edge, and wherein the display screen is configured to display the first graph by displaying, for each composite data entry, the component segments vertically adjacent to one another within the composite data entry;

and wherein the wherein the display screen is configured to display the realigned graph by moving at least one component segment so that the bottom edges of all component segments of a kind are aligned within one another along a horizontal axis.

* * * * *